US010883252B2

(12) United States Patent
Parianos et al.

(10) Patent No.: US 10,883,252 B2
(45) Date of Patent: Jan. 5, 2021

(54) SEAFLOOR HAULAGE SYSTEM

(71) Applicant: Nautilus Minerals Singapore Pte Ltd, Singapore (SG)

(72) Inventors: John Michael Parianos, Milton (AU); Roland Gunter Berndt, Milton (AU); Sean Michael Plunkett, Milton (AU)

(73) Assignee: Nautilus Minerals Singapore Pte Ltd., Singapore (SG)

( * ) Notice: Subject to any disclaimer, the term of this patent is extended or adjusted under 35 U.S.C. 154(b) by 0 days.

(21) Appl. No.: 15/312,178

(22) PCT Filed: May 19, 2015

(86) PCT No.: PCT/SG2015/000128
§ 371 (c)(1),
(2) Date: Nov. 17, 2016

(87) PCT Pub. No.: WO2015/178853
PCT Pub. Date: Nov. 26, 2015

(65) Prior Publication Data
US 2017/0121935 A1 May 4, 2017

(30) Foreign Application Priority Data
May 19, 2014 (AU) ................ 2014901855

(51) Int. Cl.
*E02F 7/00* (2006.01)
*E02F 7/06* (2006.01)
(Continued)

(52) U.S. Cl.
CPC ............ *E02F 7/005* (2013.01); *B65G 17/126* (2013.01); *B65G 17/36* (2013.01); *E02F 3/8866* (2013.01);
(Continued)

(58) Field of Classification Search
CPC ......... E02F 7/005; E02F 7/065; E02F 9/2016; E02F 9/205; B65G 17/126; B65G 17/36; E21C 50/00
See application file for complete search history.

(56) References Cited

U.S. PATENT DOCUMENTS 3,908,291 A 9/1975 Masuda
4,010,560 A 3/1977 Diggs
(Continued)

FOREIGN PATENT DOCUMENTS

DE 2922996 A1 12/1980
FR 2446375 A1 8/1980
(Continued)

OTHER PUBLICATIONS

Extended European Search Report for PCT/SG2015/000128 dated Apr. 5, 2018.

*Primary Examiner* — Tara Mayo-Pinnock
(74) *Attorney, Agent, or Firm* — Tumey L.L.P.

(57) ABSTRACT

A seafloor haulage system (10), for lifting seafloor materials from the seafloor to the surface, that has a line member (150), preferably synthetic rope, that extends at least partially between the seafloor and the surface and a container (400), preferably a plurality of containers, capable of carrying a load connected to the line member (150). The containers have a steerable element (410), such as a rudder, that enables the container to manoeuvre as it is propelled, typically towed by the line member, through the water.

44 Claims, 4 Drawing Sheets

(51) Int. Cl.
*E21C 50/00* (2006.01)
*E02F 3/88* (2006.01)
*B65G 17/36* (2006.01)
*E02F 9/20* (2006.01)
*B65G 17/12* (2006.01)
*B63B 21/66* (2006.01)
*B63C 11/52* (2006.01)
*B63G 8/42* (2006.01)

(52) U.S. Cl.
CPC .............. *E02F 7/065* (2013.01); *E02F 9/205* (2013.01); *E02F 9/2016* (2013.01); *E02F 9/2045* (2013.01); *E21C 50/00* (2013.01); *B63B 21/66* (2013.01); *B63C 11/52* (2013.01); *B63G 8/42* (2013.01)

(56) References Cited

U.S. PATENT DOCUMENTS

| | | | |
|---|---|---|---|
| 4,010,619 A | 3/1977 | Hightower et al. | |
| 4,085,973 A | 4/1978 | Payne | |
| 4,232,903 A | 11/1980 | Welling et al. | |
| 4,327,505 A | 5/1982 | Hinman et al. | |
| 4,503,629 A | 3/1985 | Uchida | |
| 4,532,617 A * | 7/1985 | Baecker | G01S 15/74 367/106 |
| 4,890,568 A * | 1/1990 | Dolengowski | B63B 21/66 114/163 |
| 2012/0000098 A1 | 1/2012 | Verboomen | |
| 2014/0090590 A1 | 4/2014 | Maurer et al. | |

FOREIGN PATENT DOCUMENTS

| | | | | |
|---|---|---|---|---|
| GB | 2496608 A | 5/2013 | | |
| JP | 2006-63740 A | 3/2006 | | |
| KR | 20110126600 A | 11/2011 | | |
| KR | 20120058974 A | 6/2012 | | |
| RU | 2001276 C1 | 10/1993 | | |
| WO | 1992010618 A1 | 6/1992 | | |
| WO | WO-2006084739 A2 * | 8/2006 | | |
| WO | 2011008447 A1 | 1/2011 | | |
| WO | 2011156867 A1 | 12/2011 | | |
| WO | WO-2012060715 A1 * | 5/2012 | ............. | B66C 13/04 |
| WO | 2013070071 A1 | 5/2013 | | |
| WO | 2013182292 A1 | 12/2013 | | |

* cited by examiner

SEAFLOOR HAULAGE SYSTEM

FIELD OF THE INVENTION

The invention relates to a haulage system preferably a seafloor haulage system operating underwater. In particular, the invention relates, but is not limited, to a mechanical seafloor haulage system with guided containers

BACKGROUND TO THE INVENTION

Reference to background art herein is not to be construed as an admission that such art constitutes common general knowledge.

In various locations in the ocean valuable seafloor materials, such as sulphide precipitates or polymetallic nodules, exist in a surface layer on the seafloor at water depths of between around 300 to 6,000 metres, often around 5,000 metres.

There have been various attempts to develop commercially viable mining systems that collect and then convey the nodules from the seafloor. One important aspect of seafloor mining systems relates to haulage systems that raise collected seafloor material to the surface. One of the key factors affecting operational costs, and hence commercial viability, is energy consumption, particularly in relation to hauling seafloor material from the seafloor to the surface.

One haulage system design is to hydraulically haul seafloor materials using some form of riser which pumps seafloor material from the seafloor to a surface vessel or platform. In one such design, a riser is provided which contains and conveys a fluid with suspended minerals therein. The riser material is typically transported in slurry form via subsea pumps and/or compressed air injected into the riser.

Although functional, these systems are energy inefficient, particularly the airlift systems where the majority of the energy loss is a result of slippage of solid particles downwards through the fluid column. Furthermore, as the seafloor materials are lifted in slurry form, they need to be dewatered at the surface requiring further processing and equipment.

Mechanical haulage systems that lift containers by a cable, such as a single drum hoist, double drum hoist or friction (Koepe) hoist as used in some underground terrestrial mines, have potential to be considerably more energy efficient. In terrestrial mines cable driven storage bins or skips winch loads of material to the surface, and make use of a plurality of guiderails to keep the storage bins in alignment. However, when applied underwater over long distances the added complexity required to compensate for the absence of a rigid support structure, using guide wires for example, these designs potentially suffer from serious entanglement and deployment issues.

Particularly, several additional guidewires are required to be located between a surface vessel and an anchor location at or near the seafloor. Over long distances underwater with varying water currents the potential for the wires to twist or tangle or for two or more bins to collide is very high. The risk of twisting or tangling, particularly when further cables are provided for other seafloor infrastructure (e.g. an umbilical for seafloor operations), is typically considered to be prohibitively high.

Additionally, in terrestrial applications the haulage systems are typically in a fixed location for the life of the mine. In seafloor mining operations the haulage system needs to be moved frequently or continuously in order to be able to collect seafloor materials, such as manganese nodules, over a very large area. Lateral drags and/or raising or lowering of the system caused by such movement further increase the likelihood of tangling of the wires or collision of the bins.

Some mitigating procedures have been considered but they all have significant operational downsides. For example, one approach to reduce the likelihood of collisions is to slow the bins down during intervals of overlap, but this slowdown reduces the operating efficiency of the system. Another approach is to enclose the bins in tubes or pipes, but in addition to the constructions required this effectively creates a pumped system, creating large frictional energy losses caused by the entrained fluids and the surrounding structures. Additional guide wires in an to attempt to exert lateral control from the surface vessel has also been considered, but this significantly increases complexity of the system and leads to higher risks of operational downtime and additional maintenance requirements.

Object of the Invention

It is an aim of this invention to provide a seafloor haulage system which overcomes or ameliorates one or more of the disadvantages or problems described above, or which at least provides a useful alternative.

Other preferred objects of the present invention will become apparent from the following description.

SUMMARY OF INVENTION

In one form, although it need not be the only or indeed the broadest form, there is provided a seafloor haulage system for lifting seafloor materials from the seafloor to the surface, the seafloor haulage system comprising:

at least one line member that extends at least partially between the seafloor and the surface; and at least one container capable of carrying a load, the container being connected to the line member;

wherein the container has a steerable element that enables the container to manoeuvre as it is propelled through the water.

Preferably the steerable element comprises at least one adjustable surface. The steerable element may comprise a rudder, flap, and/or at least one adjustable hydrofoil. Preferably the steerable element is controlled to guide the container along a path. The steerable element may be controlled remotely but is preferably controlled autonomously. Preferably the steerable element is controlled by actively trimming the steerable element.

Preferably the container is a skip. Preferably the container further comprises a position determination system, even more preferably an inertial navigation system that provides a position estimate based on inertial measurements. Alternatively, the position determination system may include magnetic compass, attitude, and/or depth sensors, with potential additional input from acoustic navigation equipment such as Ultra Short Base Line systems. Preferably the steerable element is controlled with respect to the position estimate from the position determination system. Preferably the container is programmed to follow a predetermined path.

The line member may be made of cable, rope, or wire. Preferably, the line member is made of rope, even more preferably synthetic rope, even more preferably two synthetic ropes running parallel so to spread load and reduce the consequences of failure of a single rope. The line member may be integral or may comprise a plurality of line member segments that collectively define the line member. Preferably at least some of the line member segments are connected via a container.

Preferably the line member extends from a first surface location located towards or at the surface to a deep sea location located towards or at the seafloor. Preferably the line member further extends from the deep sea location located towards or at the seafloor to a second surface location located towards or at the surface. Preferably the first surface location and the second surface location are located substantially the same distance from the deep sea location. Preferably the first surface location and the second surface location are located at substantially the same level with respect to sea level. Preferably the first surface location and the second surface location are located on opposite ends or sides of a surface vessel, e.g. ship or boat or other type of floating device.

Preferably the line member is received by a sheave at or near the first surface location, the second surface location, and/or the deep sea location. Preferably the system further comprises at least one drive element that pulls on the line member. Preferably the drive element includes a winch that receives at least a portion of the line member. Preferably the winch comprises a rotatable spool around which the line member can be wound.

Preferably the system comprises two winches, preferably in a double drum configuration. Preferably the winches are configured such that potential energy from a down-going container can be recovered by an up-going container. Preferably a first winch is located adjacent the first surface location and the second winch is located adjacent the second surface location. Preferably the first and second winches are located above the surface, but they could be located below the surface. Preferably the line member extends from the first winch to the second winch. Preferably as the line member is wound onto one winch it is unwound from the other winch. Preferably the line member is under tension between the two winches, preferably via a sheave located at or near the deep sea location.

Preferably the line member extends from the first winch to the second winch, preferably via a sheave at or near the first surface location, a sheave at or near the deep sea location, and/or a sheave at or near the second surface location. Preferably a first container is connected to the line member between the first surface location and the deep sea location, and preferably a second container is connected to the line member between the second surface location and the deep sea location. Preferably the first container and second container are spaced apart on the line member such that when one container is located at or near the deep sea location the other container will be located at or near its respective surface location.

Preferably the system further comprises a counterweight. Preferably the counterweight is located at or near the deep sea location. Preferably the counterweight is configured to ensure that the buffer is statically stable and resists the tendency to overturn. Preferably the system further comprises a buffer. Preferably the buffer is located at or near the deep sea location. Preferably the counterweight is connected to the buffer.

Preferably the buffer is suspended above the seafloor. Preferably the buffer is suspended above the seafloor by a buffer line extending from at or near the surface. Preferably the buffer line is an umbilical cable which provides services, such as power and/or data transfer, to the buffer and/or seafloor machines.

Preferably the buffer has a storage compartment for storing gathered seafloor materials. Preferably the buffer has at least one inlet for receiving gathered seafloor materials and at least one outlet for dispensing gathered seafloor materials. Preferably the inlet is connected to an inlet pipe, preferably a slurry hose inlet pipe. Preferably the outlet or outlets comprises a chute or chutes. Preferably the chutes selectively release seafloor materials when actuated. The chutes may have dosers to dispense a predetermined quantity of seafloor materials when actuated.

The buffer preferably comprises thrusters. Preferably the thrusters actively control orientation, preferably azimuthal orientation relative to a surface vessel, preferably configured to counteract twisting of the subsea rigging. The buffer preferably comprises a seafloor processing system. Preferably the seafloor processing system separates desirable seafloor materials, such as nodules, from slurry.

The container may traverse the line member, but preferably the container is affixed to the line member and is propelled by being towed by the line member. Preferably the container is affixed to at least two segments of the line member, a first line member segment for towing the container in a first direction and a second line member segment for towing the container in a second direction.

Preferably the seafloor haulage system further comprises a surface vessel. Preferably the at least one winch is mounted to the surface vessel. Preferably the line members are supported in the water by the surface vessel. Preferably a plurality of line members, preferably with respective winches, containers and/or buffers, are arranged in parallel from the surface vessel. Preferably the seafloor haulage system further comprises at least one seafloor material collection apparatus. Preferably the at least one seafloor material collection apparatus is connected by a seafloor material transfer pipe to the buffer.

In another form, there is provided a container for hauling seafloor materials from the seafloor to the surface, the container comprising:
a line member attachment assembly;
a cavity for carrying a load of seafloor material; and
at least one steerable element that enables the container to manoeuvre as it is propelled through the water.

In yet another form, there is provided a method of hauling seafloor materials from the seafloor to the surface, the method comprising the steps of:
gathering seafloor material;
transferring gathered seafloor material to at least one container located at or near the seafloor;
guiding the container from at or near the seafloor to at or near the surface using at least one steerable element; and
unloading the container to a surface vessel.

Preferably the step of gathering seafloor material comprises operating at least one seafloor material collection apparatus to gather seafloor materials. The gathered seafloor materials are preferably transferred from the at least one seafloor material collection apparatus via a pipe, preferably in slurry form.

Preferably the step of transferring gathered seafloor material to at least one container located at or near the seafloor further comprises the step of transferring the gathered seafloor material to a buffer located at or near the seafloor and then dispensing gathered seafloor material from the buffer to the at least one container. The method may further comprise the step of processing the incoming seafloor material, preferably by separating desirable seafloor materials, such as seafloor nodules, from incoming slurry, at the buffer.

Preferably the step of guiding the container from at or near the seafloor to at or near the surface comprises controlling the at least one steerable element. Preferably the container is autonomously controlled. Preferably at least two containers are provided and as one container travels towards the surface the other container travels towards the seafloor. Preferably the two containers are connected by a single line member. Preferably each container is guided to avoid collision with the other container as they pass each other, preferably by controlling the at least one steerable element. The method preferably comprises simultaneously guiding a first container towards the surface and a second container towards the seafloor.

The step of unloading the container to a surface vessel preferably comprises releasing the contents of the container into an unloading bin located at or near the surface vessel.

Preferably the method further comprises the step of towing the container with a line member. Preferably the step of towing the container with a line member comprises actuating a winch that winds the line member onto a spool. Preferably the line member is connected between two winches, preferably via a sheave at a deep sea location, and is simultaneously unwound from a first winch as it is wound onto the second winch to tow the container in a first direction, and is unwound from the second winch and wound onto the first winch to tow the container in a second direction. Preferably a first container travels between the first winch and the sheave located at or near a deep sea location and a second container travels between the second winch and the sheave located at or near a deep sea location.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
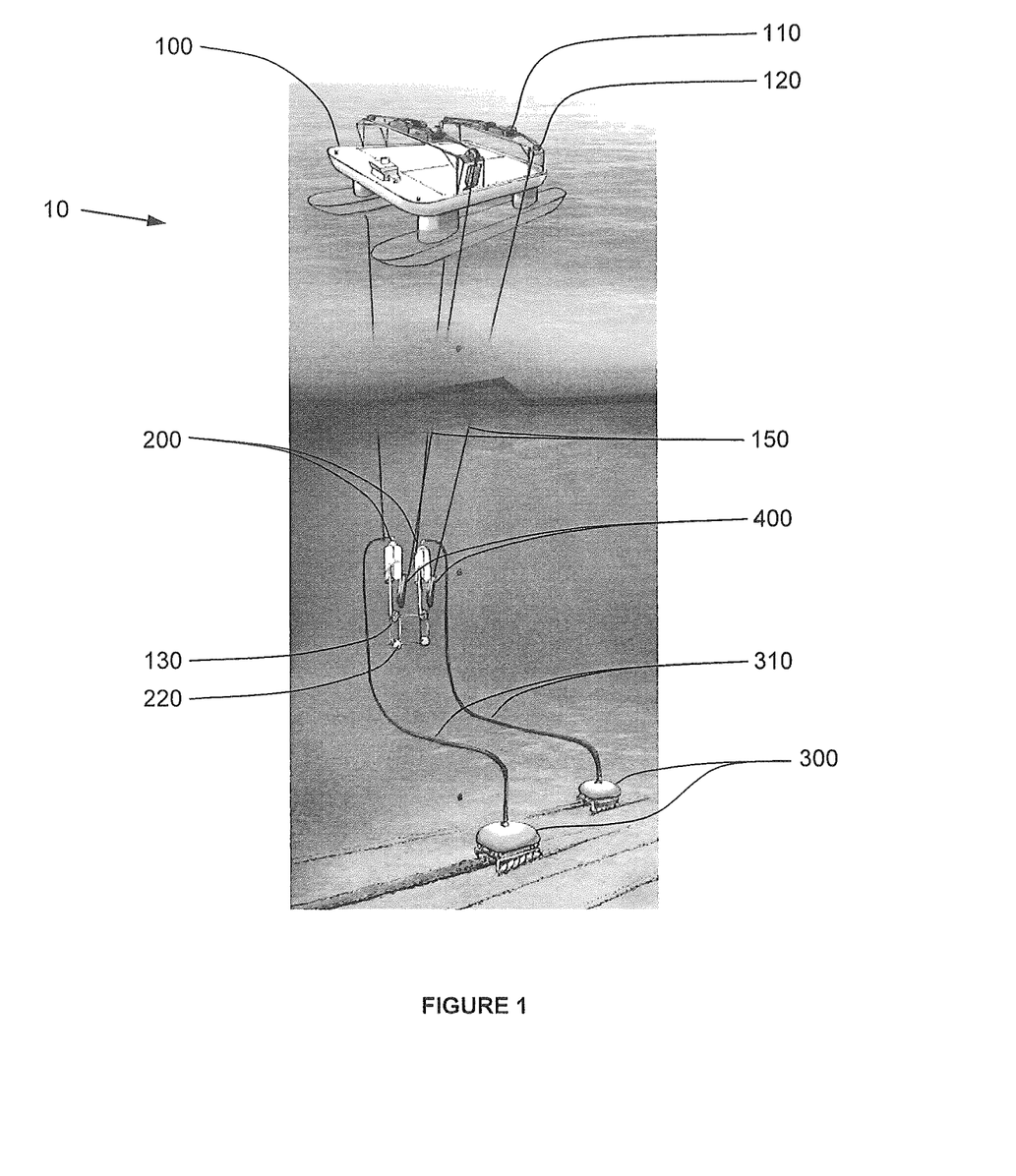
FIG. 1 is a perspective view of a seafloor haulage system.

FIG. 1 illustrates a seafloor haulage system 10 comprising a surface vessel 100, two buffers 200 located near, but suspended above, the seafloor, two seafloor material collection apparatus 300, and two (or four) containers 400 with a cavity therein to carry a load of seafloor material. The surface vessel 100 has winches 110 and sheaves 120 which are engaged with lines members 150. Winches 110 are preferably in the form of hydrographic or drum winches which may include heave compensation systems.

Containers 400 are preferably skips. Each container 400 is connected to a respective line member 150. Each seafloor material collection apparatus 300 is connected via flexible pipe in the form of a slurry hose 310 to a buffer 200. Although not shown in FIG. 1, it is preferable for the buffer to have its own power, control and communication umbilical cable. Power, control, and communication is then also provided to the seafloor material collection apparatus 300 from the buffer 200. Alternatively, the seafloor material collection apparatus 300 could be powered and/or controlled using umbilicals from another entity (e.g. the surface vessel 100). Although one seafloor collection apparatus 300 is shown per buffer 200, it will be appreciated that each buffer 200 could be connected to multiple seafloor collection apparatus 300 or multiple seafloor collection apparatus 300 could be connected to a single buffer 200.

Figure 2:
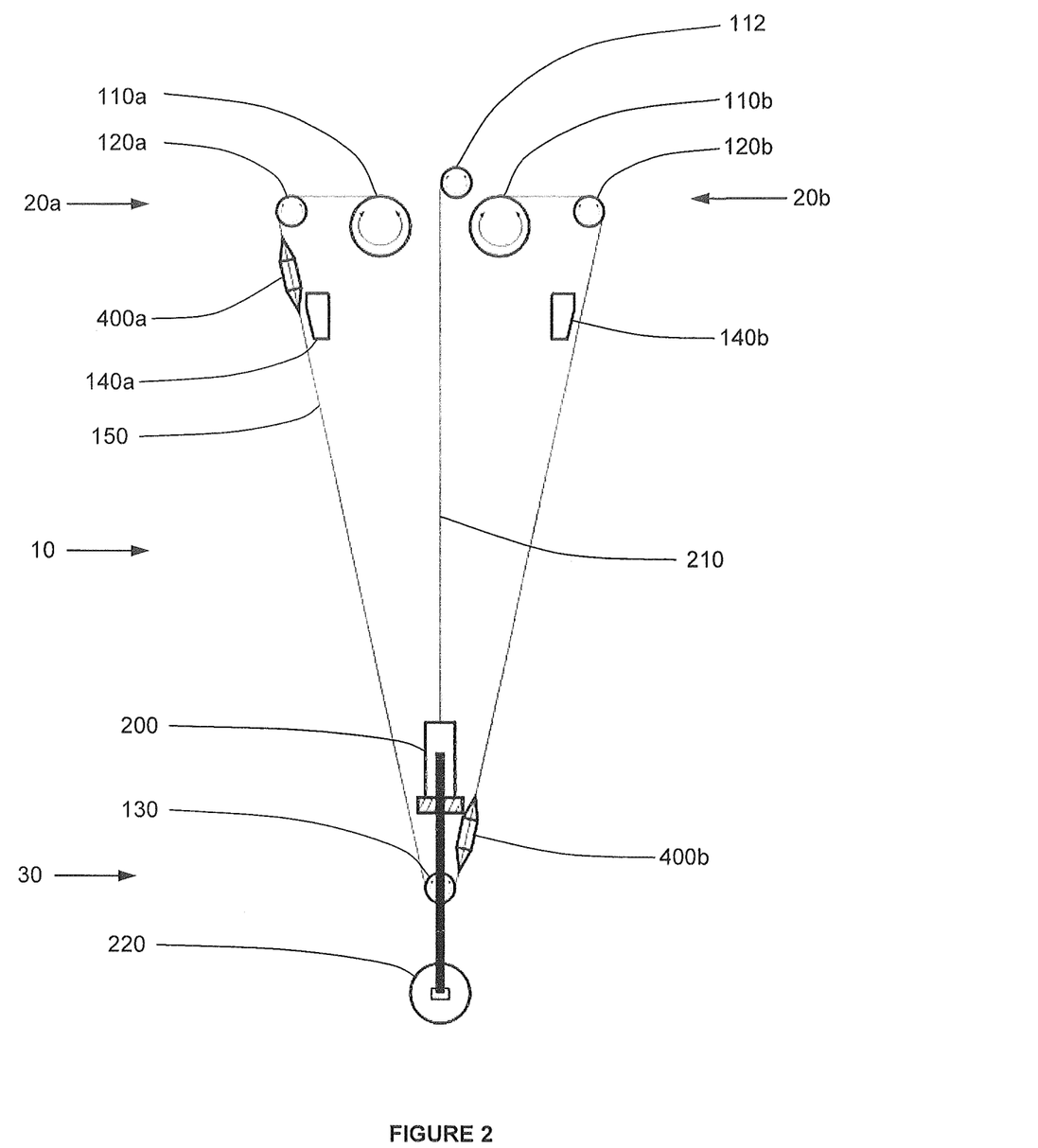
FIG. 2 is a diagrammatic side elevation representation of a seafloor haulage system.

FIG. 2 illustrates further details of haulage system 10. As seen in FIG. 2 buffer 200 is suspended by a buffer line 210 which is preferably in the form of an umbilical cable providing power, control, and/or data communications to the buffer 200 from the surface vessel 100 (not shown in FIG. 2) via a buffer winch 112. The buffer 200 is weighted by a counterweight 220 at a deep sea location 30 located towards, preferably near, the seafloor.

A line member 150, which is preferably made substantially of synthetic rope, extends from a first surface location 20a down to the deep sea location 30 and back up to a second surface location 20b which is located adjacent the first surface location 20a. Specifically, the line member 150 extends from a first winch 110a to a first surface sheave 120a to a deep sea sheave 130 located adjacent the buffer 200 to a second surface sheave 120b to a second winch 110b. The winches 110a, 110b and surface sheaves 120a, 120b are typically located on the surface vessel 100 (as shown in FIG. 1).

A first container 400a is located between the first surface sheave 120a and the deep sea sheave 130. A second container 400b is located between the second surface sheave 120b and the deep sea sheave 130. The first container 400a and the second container 400b are connected to the same line member but on opposite sides of the deep sea sheave 130. The two winches 110a and 110b are arranged such that as one winds wire onto its respective spool the other unwinds wire from its respective spool, and vice versa. The first container 400a and second container 400b are each affixed to the line member 150 by a line member attachment assembly such that connects the containers 400a, 400b between two adjacent segments of the line member 150.

A first unloading bin 140a and a second unloading bin 140b are located at the first surface location 20a and second surface location 20b, respectively. The first unloading bin 140a and second unloading bin 140b are both configured to receive material from the first container 400a and the second container 400b, respectively, when their respective container 400a, 400b is alongside. The unloading bins 140a, 140b may have a large storage capacity, possibly a shared storage capacity, or may transfer the seafloor materials to one or more silos of the surface vessel 100 for storage.

Figure 3:
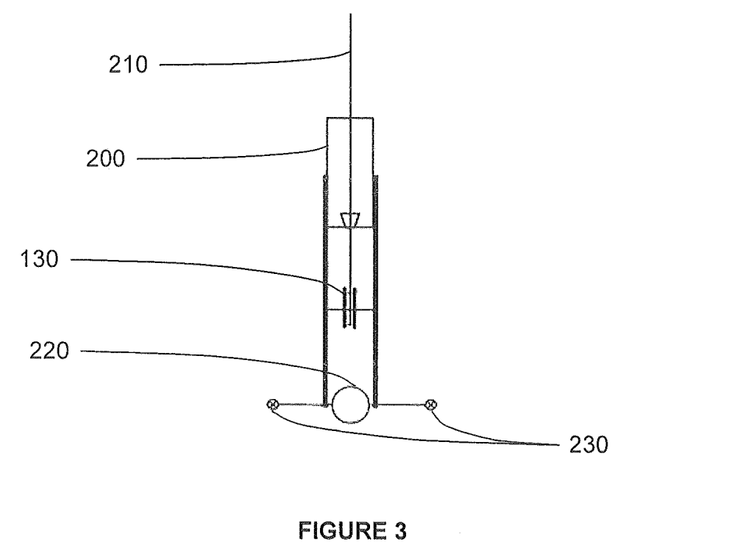
FIG. 3 is a diagrammatic side elevation representation of a buffer.

FIG. 3 illustrates a buffer 200 suspended by buffer line 210 and weighted down by counterweight 220. The buffer 200 has azimuth thrusters 230. Although the thrusters 230 are illustrated as extending from the counterweight 220, it will be appreciated that they could also be located on other parts of the buffer 200. The thrusters 230 server to provide azimuth and lateral maneuverability of the buffer 200.

In particular, the thrusters 230 can be used to actively control orientation of the buffer 200, primarily azimuthal orientation relative to the surface vessel 100 This enables the buffer 200 to maintain correct orientation relative to the surface vessel to prevent any entanglement cause by twisting of any of the lines (e.g. line member 150, buffer line 210, and any other lines extending from the surface vessel 100). The thrusters 230 of the buffer 200 are preferably controlled autonomously or remotely from the surface vessel 100.

Figure 4:
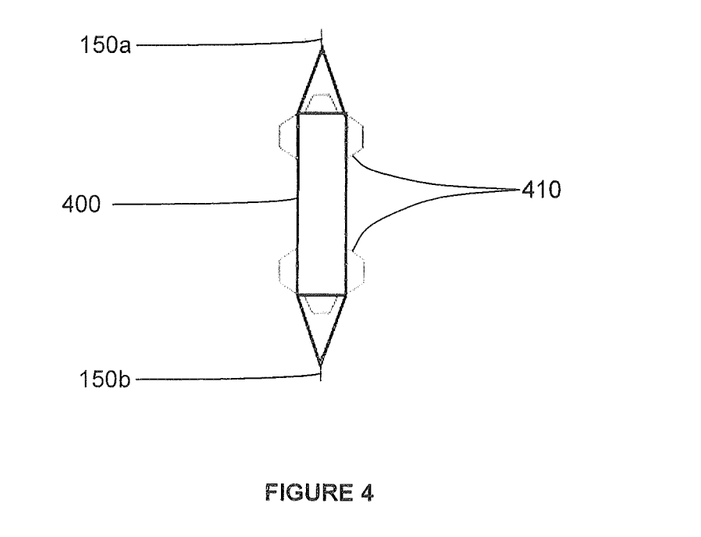
FIG. 4 is a diagrammatic side elevation representation of a container.

FIG. 4 illustrates a container 400 connected between a first segment 150a and a second segment 150b of the line member 150. The container 400 has steerable elements in the form of adjustable flaps 410 which enable the container 400 to manoeuvre as it is pulled through the water by the lines members. The container 400 is programmed to autonomously or via remote control to direct the container 400 on a path that avoids entanglement or collision with any lines or other containers operating in the area as it is pulled by the line member 150.

The container 400 has a position determination system, preferably in the form of an inertial navigation system, that provides control systems for the container 400 with position estimates. The position determination system preferably includes a plurality of sensors including at least one or more of, heading, pitch, roll, position and depth sensors. The flaps 410 are then trimmed with respect to the position estimate and sensor outputs to direct the container 400 along a substantially predetermined path.

The container 400 preferably has a power storage system, typically including a battery, which provides the necessary power for control systems and the adjustable flaps 410 to be trimmed. Preferably the power storage system is interchangeable or charged when the container 400 is located at its surface position 20a, 20b. Alternatively, with an appropriate line member 150 the container 400 could be powered and/or controlled from the surface vessel 100 via the line member 150.

The container 400 is preferably connected to two line members 150 above and two line members below (e.g. in a Blair multi-rope configuration of a double drum hoist system). The two line members 150 above the container 400 allow the container 400 to be azimuthally oriented, without the need for hydrodynamic steering, when the container 400 slows down as it approaches the unloading bin of the surface vessel 100. Likewise, the two line members 150 below the container 400 allow the container 400 to be azimuthally oriented, without the need for hydrodynamic steering, when the container 400 slows down as it approaches the buffer 200 near the seafloor.

Figure 5:
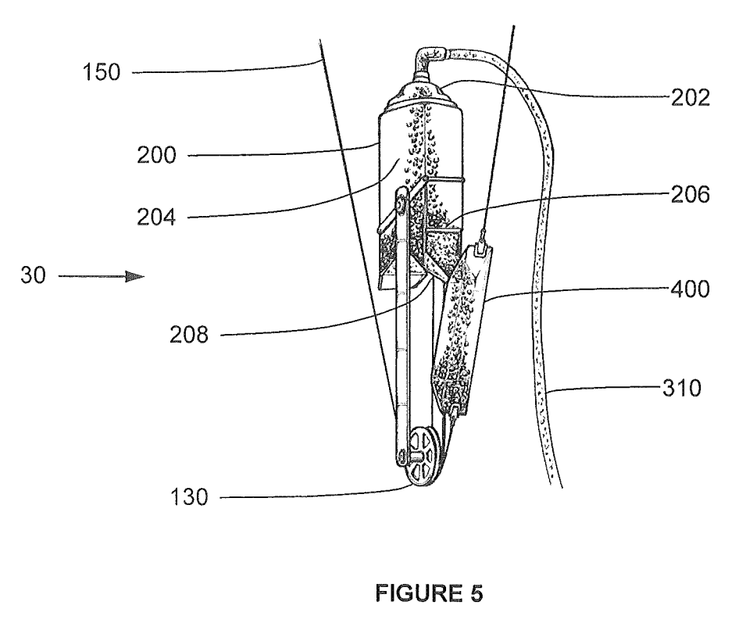
FIG. 5 is a close-up perspective view of a buffer unloading material into a container.

FIG. 5 illustrates a close up view of a buffer 200 when unloading seafloor materials into a container 400. Buffer 200 has an inlet 202 that receives gathered seafloor materials from seafloor collection apparatus 300 via slurry hose 310. The gathered seafloor materials are then stored in storage compartment 204 of the buffer 200 ready to be unloaded to a container 400. The storage compartment 204 preferably has a capacity sufficient to at least fully load a single container 400 without having to wait for further materials to be received over slurry hose 310. The seafloor material contained in storage compartment 204 of the buffer 200 assists the counterweight 220 (not shown in FIG. 5) to weigh the buffer 200 down in the water. The counterweight 220 (not shown in FIG. 5) located below the sheave 130 assists to weigh the buffer 200 down and also acts to prevent overturning of the buffer 200.

When container 400 is located at deep sea location 30 as illustrated in FIG. 5 the seafloor materials are transferred from the storage compartment 204 of the buffer 200 to the container 400 via outlet 206 of the buffer 200. Outlet 206 of the buffer 200 is located at an upper end of the storage compartment 204 to enable gravity feeding of the storage materials down chute 208. Alternatively, or additionally, the seafloor materials may be urged toward the container 400 using an appropriate mechanism such as, for example, an Archimedes screw feeder.

Chute 208 is preferably actuated to open outlet 206 when the container 400 arrives to the deep sea location 30 (as shown in FIG. 5) and to close outlet 206 when the container 400 leaves the deep sea location 30 to prevent loss of seafloor materials from inside the storage compartment 204. Chute 208 may be actuated by any suitable means such as mechanically or hydraulically by the storage container 400 or electronically either automatically or via control from the surface vessel 100.

As shown in FIG. 1, the seafloor haulage system 10 can be expanded from a single line member 150 system (as shown in FIG. 2) to have multiple line members 150 (e.g. two adjacent line members 150 as shown in FIG. 1) working adjacent each other, each with respective containers 400 and buffers 200. Larger arrays of line members 150 with associated containers 400 and buffers 200 could also be used to scale the system as needed.

In use, seafloor materials are gathered by seafloor collection apparatus 300 and pumped in slurry form over slurry hose 310 to the buffer 200. The buffer 200 may optionally process the received seafloor material, and collects the gathered seafloor material in temporary storage compartment 204. First container 400a is lowered to the buffer 200 by actuating second winch 110b which pulls the first container 400a via the line member 150. Once the first container 400a arrives at the buffer 200, gathered seafloor material is transferred from the buffer 200 to the container 400a. Once the buffer 200 has dispensed the required seafloor material, the first container 400a is pulled, via line member 150, back to the surface by actuating the first winch 110a.

As the first winch 110a is actuated the second container 400b is simultaneously pulled down, via line member 150, to the buffer 200. The first container 400a and second container 400b are spaced apart on the line member such that when the first container 400a is at the surface the second container 400b is at the buffer 200 and vice versa. Once the first container 400a arrives at the surface and the second container 400b arrives at the buffer the first container then unloads the seafloor material to the surface vessel 100 via unloading bin 140a. At, or at least around, the same time, the buffer 200 transfers gathered seafloor material to the second container 400b. Second container 400b is then pulled the surface to second unloading bin 140b, which in turn pulls first container 400a back down to the buffer 200, and the process repeats.

Advantageously the seafloor haulage system 10 provides, a mechanical haulage system that is energy efficient compared to hydraulic riser systems while also reducing the likelihood of entanglement of subsea lines or collision of passing containers. Furthermore, it is easily relocatable by raising the deep sea components towards the surface, moving them to a new location, and then lowering them at the new location. This reduces relocation costs and set up times which ultimately increases productivity as the seafloor mining system covers large areas of the seafloor.

While the figures illustrate the distance between the surface and the seabed as being relatively close, this is for convenience only and it will be appreciated that the present invention will typically be used in deep sea applications where the seabed is over 2,000 m, typically around 5,000 m, deep. References herein to the seafloor, seabed, subsea, or the like are for convenience only and could equally be applied to other bodies of water such as, for example, a lake with a lakebed, etc.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

What is claimed is:

1. A seafloor haulage system for lifting seafloor materials from the seafloor to the surface, the seafloor haulage system comprising:
   at least one line member that extends at least partially between the seafloor and the surface;
   at least one container capable of carrying a load, the container being connected to the line member; and
   a buffer located at or near a deep sea location wherein the buffer has: a storage compartment for storing gathered seafloor materials; at least one inlet connected to an inlet pipe for receiving gathered seafloor materials; and at least one outlet comprising a chute to selectively release seafloor materials when actuated for dispensing gathered seafloor materials from the buffer, wherein the storage compartment is connected to the inlet pipe and the chute;
   wherein the container has a steerable element that enables the container to maneuver as it is propelled through the water,
   wherein the steerable element comprises at least one adjustable surface, and
   wherein the container comprises a position determination system adapted to provide a position estimate.

2. The seafloor haulage system of claim 1, wherein the steerable element comprises a rudder, flap, and/or at least one adjustable hydrofoil.

3. The seafloor haulage system of claim 1, wherein the steerable element is controlled to guide the container along a path.

4. The seafloor haulage system of claim 1 wherein the steerable element is controlled autonomously.

5. The seafloor haulage system of claim 1, wherein the steerable element is controlled remotely.

6. The seafloor haulage system of claim 1, wherein the steerable element is controlled by actively trimming the steerable element.

7. The seafloor haulage system of claim 1, wherein the container is a skip.

8. The seafloor haulage system of claim 1 wherein the position determination system comprises an inertial navigation system that provides a position estimate based on inertial measurements.

9. The seafloor haulage system of claim 1, wherein the position determination system includes magnetic compass, attitude, and/or depth sensors.

10. The seafloor haulage system of claim 1, wherein the position determination system includes input from acoustic navigation equipment.

11. The seafloor haulage system of claim 1, wherein the steerable element is controlled with respect to the position estimate from the position determination system.

12. The seafloor haulage system of claim 1 wherein the container is programmed to follow a predetermined path.

13. The seafloor haulage system of claim 1, wherein the line member is made of cable, rope, or wire.

14. The seafloor haulage system of claim 13, wherein the line member is at least substantially made of synthetic rope.

15. The seafloor haulage system of claim 14, wherein the line member comprise two synthetic ropes running parallel.

16. The seafloor haulage system of claim 13, wherein the line member is integral.

17. The seafloor haulage system of claim 13, wherein line member comprises a plurality of line member segments that collectively define the line member.

18. The seafloor haulage system of claim 17, wherein at least some of the line member segments are connected via a container.

19. The seafloor haulage system of claim 1, wherein the line member extends from a first surface location located towards or at the surface to a deep sea location located towards or at the seafloor.

20. The seafloor haulage system of claim 19, wherein the line member further extends from the deep sea location located towards or at the seafloor to a second surface location located towards or at the surface.

21. The seafloor haulage system of claim 20, wherein the first surface location and the second surface location are located substantially the same distance from the deep sea location and at substantially the same level with respect to sea level.

22. The seafloor haulage system of claim 20, wherein the first surface location and the second surface location are located at opposite ends or sides of a surface vessel.

23. The seafloor haulage system of claim 20, wherein the line member is received by a sheave at or near the first surface location, the second surface location, and/or the deep sea location.

24. The seafloor haulage system of claim 1, further comprising at least one drive element that pulls on the line member.

25. The seafloor haulage system of claim 24, wherein the drive element includes a winch that receives at least a portion of the line member.

26. The seafloor haulage system of claim 25, wherein the drive element comprises two winches arranged in a double drum configuration such that potential energy from a down-going container can be recovered by an up-going container.

27. The seafloor haulage system of claim 25, wherein a first winch is located adjacent a first surface location and the second winch is located adjacent a second surface location and the line member extends under tension from the first winch to the second winch via a sheave located at or near a deep sea location.

28. The seafloor haulage system of claim 27, wherein the line member extends from the first winch to the second winch via a sheave at or near the first surface location, a sheave at or near the deep sea location, and a sheave at or near the second surface location.

29. The seafloor haulage system of claim 27, wherein a first container is connected to the line member between the first surface location and the deep sea location and a second container is connected to the line member between the second surface location and the deep sea location.

30. The seafloor haulage system of claim 29, wherein the first container and second container are spaced apart on the line member such that when one container is located at or near the deep sea location the other container will be located at or near its respective surface location.

31. The seafloor haulage system of claim 1, further comprising a counterweight connected to the buffer.

32. The seafloor haulage system of claim 1 wherein the buffer is suspended above the seafloor by a buffer line extending from at or near the surface.

33. The seafloor haulage system of claim 1, wherein the chutes have dosers to dispense a predetermined quantity of seafloor materials when actuated.

34. The seafloor haulage system of claim 1, wherein the buffer comprises thrusters.

35. The seafloor haulage system of claim 1, wherein the thrusters actively control orientation of the buffer relative to a surface vessel.

36. The seafloor haulage system of claim 1, wherein the buffer comprises a seafloor processing system that separates seafloor materials from slurry.

37. A method of hauling seafloor materials from the seafloor to the surface, the method comprising the steps of:
    gathering seafloor material;
    transferring gathered seafloor material to at least one container located at or near the seafloor;
    guiding the container from at or near the seafloor to at or near the surface using at least one steerable element; and
    unloading the container to a surface vessel, wherein the container comprises a position determination system adapted to provide a position estimate;
    wherein the at least one steerable element comprises at least one adjustable surface; and
    wherein the step of transferring gathered seafloor material to at least one container located at or near the seafloor further comprises the step of transferring the gathered seafloor material to a buffer located at or near the seafloor and then dispensing gathered seafloor material from the buffer to the at least one container, wherein the buffer has: a storage compartment for storing gathered seafloor materials; at least one inlet connected to an inlet pipe for receiving gathered seafloor materials; and at least one outlet comprising a chute selectively release seafloor materials when actuated for dispensing gathered seafloor materials from the buffer, wherein the storage compartment is connected to the inlet pipe and the chute.

38. The method of claim 37, wherein the step of gathering seafloor material comprises operating at least one seafloor material collection apparatus to gather seafloor materials.

39. The method of claim 37, wherein the gathered seafloor materials are transferred from the at least one seafloor material collection apparatus via a pipe in slurry form.

40. The method of claim 37, further comprising the step of processing the incoming seafloor material, by separating seafloor materials from incoming slurry, at the buffer.

41. The method of claim 37, wherein the step of guiding the container from at or near the seafloor to at or near the surface comprises controlling the at least one steerable element.

42. The method of claim 37, wherein at least two containers are provided and as one container travels towards the surface the other container travels towards the seafloor.

43. The method of claim 42, wherein the two containers are connected by a single line member and each container is guided to avoid collision with the other container as they pass each other.

44. The method of claim 37 further comprising the step of towing the container with a line member connected between two winches via a sheave at a deep sea location such that the line member is simultaneously unwound from a first winch as it is wound onto the second winch to tow the container in a first direction, and is unwound from the second winch and wound onto the first winch to tow the container in a second direction.

* * * * *